Figure 1:
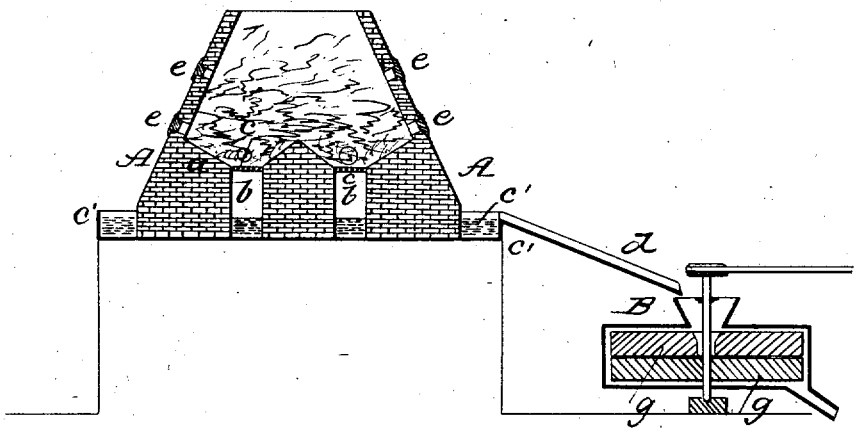
Figure 2:
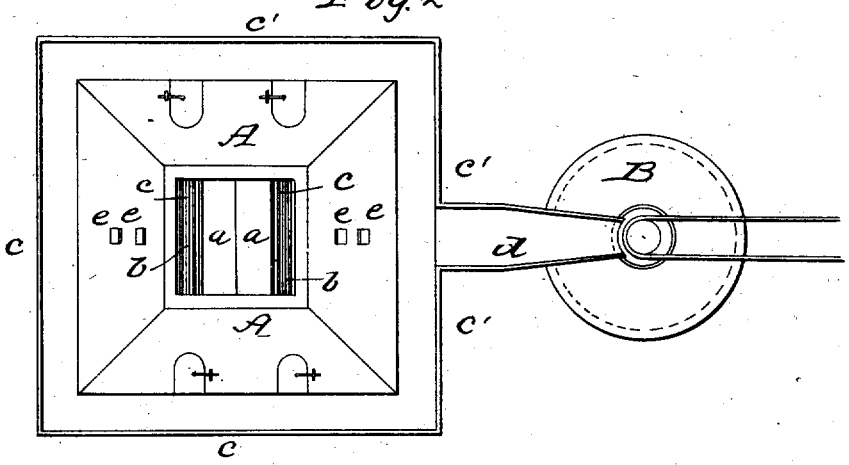

R. SPENCER.

Method of Decomposing and Desulphurizing Ores.

No. 2,022. Reissued July 4, 1865.

WITNESSES
R. T. Campbell
C. Schafer

INVENTOR
Robert Spencer
by his atty.
Mason Fenwick & Lawrence

N. PETERS, Photo-Lithographer, Washington, D. C.

UNITED STATES PATENT OFFICE.

ROBERT SPENCER, OF NEW YORK, N. Y.

IMPROVED METHOD OF DECOMPOSING AND DESULPHURIZING ORES.

Specification forming part of Letters Patent No. 44,986, dated November 8, 1864; Reissue No. 2,022, dated July 4, 1865.

DIVISION B.

*To all whom it may concern:*

Be it known that I, ROBERT SPENCER, of the city and county of New York, in the State of New York, have invented a new and useful process for reducing the ores of the percious metals when they are found embedded in quartz rock; and I do hereby declare the following to be a full, clear, and exact description of my invention.

An apparatus for carrying my invention into practical effect is fully shown in Division No. 1, of my reissued patent, of which this is the second division; but I do not intend to limit my claims to a process carried out by virtue of that apparatus, as will more fully be shown hereinafter.

My invention relates more particularly to the reduction of ores embedded in rock where the precious metals are found combined with sulphur, which greatly interferes with the process of amalgamation by which the finer particles of those metals are ultimately secured.

It consists in subjecting the rock containing the ores to high heat for a long period of time, after which it is plunged into a liquid bath. It is then finely pulverized, and afterward subjected to the amalgamating or other process by which the precious metals are extracted. The high and long-continued heat effectually drives off the sulphur, and the sudden chilling disintegrates the rock and renders it capable of being very easily pulverized to a degree that renders it possible to obtain a much larger portion of the gold and silver than has been obtained by any of the usual processes.

I am aware that attempts have heretofore been made to reduce these ores by heating and plunging them, when hot, into liquid baths. I only claim my peculiar mode of effecting this end.

By the process heretofore known the rock was first broken into nodules, and after being highly heated was plunged into the bath. This rendered the rock more friable, but did not effectually remove the sulphur. After the quartz had been coarsely granulated it was again subjected to heat in order to drive off another portion of the sulphur, which even then was very imperfectly accomplished.

By my process I avoid the necessity of first breaking the rock into nodules as well as that of the second heating of the granulated quartz. I also much more effectually remove the sulphur, and consequently obtain a more perfect separation of the precious metals. The process, therefore, is not only much cheaper, but also much more effectual.

I take the rock as it comes from the quarry and subject it to a high heat for several hours. The heat should be as high a possible without melting the rock. It should be continued until the sulphur is effectually removed, which will require from five to seven hours. The larger the amount of sulphur the sooner it becomes separated from the rock, the more porous and friable will the rock be left, and, therefore, it will be the more easily pulverized. A skillful operator will readily judge when the process has been continued a sufficient time. There is no injury done by continuing the heat longer than is necessary, but merely a waste of fuel. Neither will an excess of heat produce essential detriment, for the melted quartz, when precipitated glowing hot into the bath, becomes almost as friable as though it had not been fused.

I prefer the use of coke as a fuel, though other combustibles will answer the purpose for heating the quartz rock. The quantity of fuel must always be different in different furnaces, which is to be determined by experiment. Enough should be used to continue the heat for the requisite length of time. After being heated for the proper time it is plunged as soon as possible into water, either pure or impregnated with acid or substances which may aid in producing the desired effect. Water alone will answer a good purpose; but by the addition of chemical agents I have ascertained that the rock may, to some extent, be decomposed and greatly softened preparatory to being crushed. Sulphuric acid is the best agent for this purpose, but other chemical ingredients will produce a very useful result.

Instead of being plunged into a bath, a jet of water may be thrown upon the heated quartz; or it may be so placed that at the proper time a sluice may be opened for the purpose of suddenly quenching the heated rocks.

After being prepared in any of these methods the rock is then pulverized by any proper machinery and will be found free from sulphur, capable of being easily and thoroughly subdivided into the finest particles and in the most favorable conditions to enable the amalgamating process to have the fullest effect.

Having thus described my invention, what I claim as new, and desire to secure by Letters Patent, is—

1. The above-described process of removing sulphur from quartz rock and rendering such rock pulverulent by long-continued and high heat and subsequent sudden precipitation into a liquid bath.

2. Reducing the ores of the precious metals, when embedded in rock and combined with sulphur, without the necessity of previously breaking the rock into nodules, by heating and quenching, substantially as above described.

3. The effectual separation of the precious metals from quartz rock and sulphur, without the necessity of the second heating of the granulated quartz, by heating and quenching, substantially as described above.

4. The use of a bath for quenching the heated rock, consisting of water impregnated with ingredients that act chemically upon the rock, for the purpose of softening it and preparing it for the action of the grinding apparatus.

ROBT. SPENCER.

Witnesses:
R. T. CAMPBELL,
E. SCHAFER.